(12) United States Patent
Ogino

(10) Patent No.: US 6,427,047 B1
(45) Date of Patent: Jul. 30, 2002

(54) APPARATUS AND METHOD FOR PROTECTING THE UNAUTHORIZED DUPLICATION OF A SIGNAL

(75) Inventor: Akira Ogino, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/093,348

(22) Filed: Jun. 9, 1998

(30) Foreign Application Priority Data

Jun. 10, 1997 (JP) .......................................... P09-151993

(51) Int. Cl.[7] .......................... H04N 5/91; H04N 7/167; A61F 2/06; H04L 27/30
(52) U.S. Cl. .......................... 386/94; 375/130; 380/204
(58) Field of Search ....................... 386/1, 94; 375/130, 375/135, 140, 146, 141; 380/204, 205, 210

(56) References Cited

U.S. PATENT DOCUMENTS

| | | | | |
|---|---|---|---|---|
| 5,243,411 A | * | 9/1993 | Shirochi et al. | 360/60 |
| 5,311,543 A | * | 5/1994 | Schreiber | 375/141 |
| 5,315,448 A | * | 5/1994 | Ryan | 386/94 |
| 5,510,900 A | | 4/1996 | Shirochi et al. | 358/335 |
| 6,023,551 A | * | 2/2000 | Sugita et al. | 386/94 |
| 6,035,177 A | * | 3/2000 | Moses et al. | 348/1 |
| 6,112,008 A | * | 8/2000 | Sugita et al. | 386/94 |
| 6,122,403 A | * | 9/2000 | Rhoads | 382/233 |

* cited by examiner

Primary Examiner—Andrew B. Christensen
Assistant Examiner—Polin Chieu
(74) Attorney, Agent, or Firm—Jay H. Maioli

(57) ABSTRACT

An additional information produced by an additional information signal producing curcuit is spectrum-spread by a spectrum spreading code generated on the basis of the timing of the synchronous signal of digital video signal and is then added to the digital video signal by means of a signal adder. The digital video signal to which the spectrum spread additional information signal is added is then written into a recording medium by a signal writing device. Thereby, the additional information signal can be added to the video signal under the condition that the reproducing quality of the video signal is never deteriorated and alteration and deletion are impossible and moreover the additional information signal can be detected for use as required from the video signal.

10 Claims, 7 Drawing Sheets

ADDITIONAL INFORMATION SPECTRUM BEFORE SPECTRUM SPREAD

ADDITIONAL INFORMATION SPECTRUM AFTER SPECTRUM SPREAD

INFORMATION SIGNAL SPECTRUM TO WHICH SS ADDITIONAL INFORMATION IS SUPERIMPOSED

SIGNAL SPECTRUM AFTER INVERSE SPECTRUM SPREAD IN THE RECORDING APPARATUS SIDE

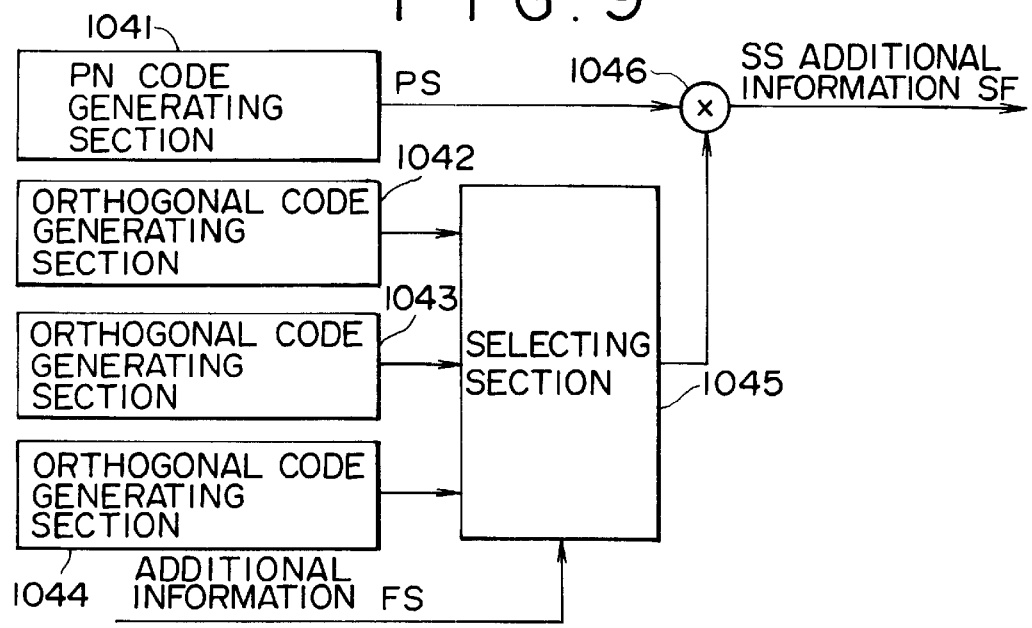
F I G. 9
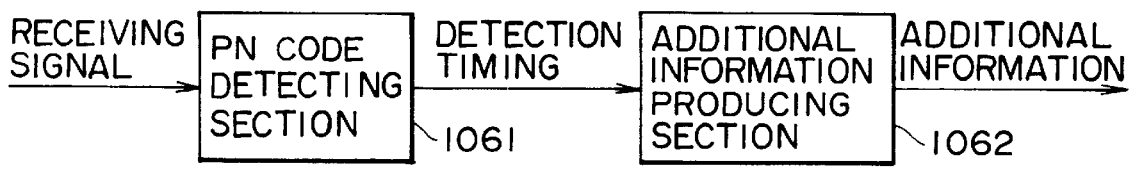
F I G. 10
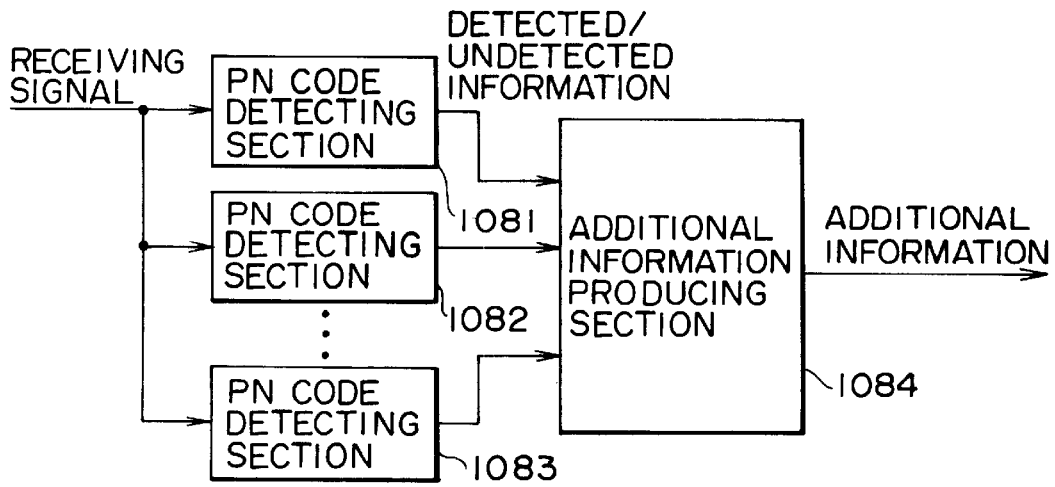
F I G. 11

APPARATUS AND METHOD FOR PROTECTING THE UNAUTHORIZED DUPLICATION OF A SIGNAL

BACKGROUND OF THE INVENTION

1. Field of the Invention

The present invention relates to a video signal recording apparatus which is called an authoring apparatus to form, for example, one video signal from the video signal recorded on a plurality of recording media and record this video signal to a recording medium and a video signal recording method which is preferably applied to this authoring apparatus which is used by a manufacturer, etc. for manufacturing a recording medium in which a video signal is recorded.

2. Description of the Related Art

Nowadays, a variety of the reproducing apparatus of digital VTR and DVD (Digital Video DiSC) and software which may be reproduced utilizing these apparatuses have been offered. Accordingly, it is now possible at home to easily reproduce the digital video signal and voice signal to enjoy high quality and high fidelity image and sound.

Moreover, a large amount of digital video and voice signals or programs have also been offered by way of a recording medium such as CD-ROM (Compact Disc ROM) and thereby it is now also possible to widely use digital software provided via the CD-ROM by utilizing a personal computer.

However, here rises a problem, on the other hand, that softwares such as digital video signals which are offered with a large amount of information may be duplicated without any limitation. Therefore, when the digital information, for example, the digital video signal is processed, a direct duplication preventing control such as inhibition of duplication is effectuated by adding a duplication control information consisting of a duplication preventing code or a duplication generation limiting code to a digital video signal and then recording the information and video signal to a recording medium.

For example, in the side of the manufacturer of a recording medium in which an information signal such as a digital video signal, for example, is recorded, an original recording medium in which the information signal such as the digital video signal used for the mastering is produced utilizing an information signal recording apparatus which is called an authoring apparatus.

This authoring apparatus receives a supply of a plurality of information sources, for example, a digital video signal recorded in a plurality of recording media, forms a digital video signal to be recorded by editing these digital video signals and then records such digital video signal to a recording medium.

In this case, a duplication control information indicating the contents of the duplication control such as acknowledgment of duplication, inhibition of duplication and limitation on generation of duplication is added in direct, for the main information signal such as the header of data in block units, to the digital video signal as the main information signal recorded on the recording medium. Thereby, the digital video signal as the main information signal and the duplication control information as the additional information are recorded on the recording medium.

In the case where a recording medium in which an information signal is recorded through the mastering is manufactured depending on the recording medium produced as explained above, the digital video signal and the duplication control information for the relevant digital video signal are recorded on the recording medium manufactured as explained above.

Moreover, when it is attempted to duplicate the digital video signal recorded on the manufactured recording medium to the other recording medium, the information recorded on the relevant recording medium is reproduced utilizing a digital reproducing apparatus to obtain the duplication control information together with the digital video signal and these signals obtained are then sent to a digital recording apparatus via the digital transmission line.

In the digital recording apparatus, the duplication control information is detected from the information received through the digital transmission line to discriminate contents of the duplication control. Thereby, recording control of the input digital video signal is conducted depending on such discrimination result.

For example, when contents of the duplication control indicated by the duplication control information acknowledge duplication of the digital video signal, the input digital video signal is converted to the digital information which is suitable for recording and recording (duplication) is executed by writing such digital information to a recording medium for recording. Meanwhile, contents of the duplication control indicated by the detected duplication control signal inhibit duplication, recording (duplication) of the input digital video signal is not executed.

Moreover, when contents of the duplication control indicated by the duplication control information acknowledge only the duplication of the first generation, the input digital video signal is converted to the digital information which is suitable for recording, it is then written to the recording medium for recording to execute the recording. Simultaneously, the duplication control information as the additional information is changed to the information instructing inhibition of duplication (inhibition of duplication of the next generation) and it is then recorded in the recording medium for recording. Therefore, it is impossible to further duplicate the duplicated digital video signal utilizing the duplicated recording medium for recording.

As explained above, in the case of the so-called digital connection where a main information signal and a duplication control information as the additional information are supplied to a recording apparatus as the digital signals, since the duplication control information is included in the digital data to be transmitted, the duplication control such as inhibition of duplication can surely be realized in the recording apparatus utilizing this duplication control information.

Even in the case of obtaining the digital video signal and the duplication control information by reproducing, with a digital reproducing apparatus, the information recorded in the recording medium where the digital video signal as the main information signal and the duplication control information as the additional information are recorded as explained above, only the digital video signal which is the main information signal is converted to an analog signal through a D/A converting circuit and is then led, for example, to monitor the display image, to an analog output terminal which is usually connected with a monitor receiver.

As explained above, even in the case of the reproducing apparatus for the digital information, the analog signal led to the analog output terminal does not include the duplication control signal. Therefore, in the case of the analog connection in which an analog VTR is connected to the analog output terminal, duplication of the main information signal is possible.

Moreover, even in the digital connection, since the duplication control information is often added separated from the digital video signal as the main information signal of the header section, it is probable that duplication of the main information signal is possible by erasing the information of the part where the duplication control information is added or by alteration of information such as replacement with the other information.

Moreover, even when the video signal and voice signal as the main information signals are analog signals or digital signals, if the duplication control information is superimposed or added to the frequency band which is different from the frequency band of the video signal and voice signal, the duplication control information is eliminated by a frequency filter of the simplified structure and duplication of the main information signal becomes possible.

SUMMARY OF THE INVENTION

Considering the background explained above, it is therefore an object of the present invention to add an additional information to an information signal in such a manner that reproducing quality of the information signal is never deteriorated and alteration and erasure of the additional information are impossible.

The video signal recording apparatus of the present invention is characterized in comprising a timing signal generating means for generating a timing signal based on the synchronous signal of the video signal, a spectrum spread code generating means for generating a spectrum spread code signal synchronously with the timing signal, an additional information signal producing means for producing an additional information signal to be added the video signal, a spectrum spreading means for spreading the spectrum of the additional information signal with the spectrum spreading signal, a signal adding means for adding the spectrum spread additional information signal to the video signal to output the video signal for the recording operation and a signal writing means for recording the video signal for recording sent from the signal adding means to a recording medium.

According to the video signal recording apparatus of the present invention, the additional information is spectrum spread and superimposed to the information signal in the same time and within the same frequency band. The information signal to which the spectrum spread additional information is superimposed is then recorded in a recording medium.

The additional information is spectrum spread and is superimposed as a wide band and low level signal to the digital information signal itself. Therefore, the additional information will never deteriorate the information signal. Moreover, since the additional information is superimposed to the information signal itself, it becomes impossible to alter and erase the additional information through replacement of the frequency filter and only of the information signal in such a case that the relevant information signal is reproduced and transmitted. Moreover, even when the information signal is a digital signal and it is converted to an analog signal, the additional information is never eliminated because the additional information is superimposed on the information signal in the same time and within the same frequency band as explained above.

Thereby, it becomes possible to surely provide the information signal and the additional information added thereto, for example, in the recording apparatus side. Accordingly, when the additional information indicates, for example, the contents of the duplication control, the recording control can be surely executed in the recording apparatus side depending on the relevant additional information. When the additional information is used for the purpose of copyright protection as explained above, the copyright can be protected extensively.

Moreover, the information signal recording apparatus of the present invention is provided with an adding means for adding the additional information sent from the additional information generating means to the video signal.

Thereby, an additional information is added to the information signal and the spectrum spread additional information is superimposed to the information signal. For example, the additional information is added by the adding method to the information signal, for example, in such a manner that the additional information is stored to a header of the recording medium in which the digital information signal is recorded or added through insertion to the digital information signal and the spectrum spread additional information is also superimposed on the digital information signal.

Therefore, reliability and strength of the additional information added to the information signal can be enhanced so that the other additional information added by the method different from one method can remain even if one additional information is altered or erased, by adding and superimposing, for example, the additional information of the same contents with a different method. Moreover, it is also possible here to add the additional information of different contents to the information signal by the different method. In this case the, total amount of the additional information for the information signal can be increased.

BRIEF DESCRIPTION OF THE DRAWINGS

Other objects and advantages of the present invention will be apparent from the following detailed description of the presently preferred embodiments thereof, which description should be considered in conjunction with the accompanying drawings in which:

FIG. 9 is a block diagram for explaining the other example of the SS additional information producing section;

FIG. 10 is a block diagram showing an example of the SS additional information detecting section; and FIG. 11 is a block diagram showing the other example of the SS additional information detecting section.

DESCRIPTION OF THE PREFERRED EMBODIMENTS

The preferred embodiments of the present invention will be explained with reference to the accompanying drawings.

The information signal authoring system explained below utilizes the information signal recording apparatus and information signal recording method of the present invention. This information signal authoring system is used in the side of the manufacturer manufacturing a recording medium having recorded thereon an information signal to form one information signal from a plurality of information signals and record this information signal to the recording medium in order to generate an original recording medium having recorded the object information signal, for example, to be used for the mastering. Moreover, the information signal authoring explained hereunder is composed of a plurality of digital reproducing apparatuses (hereinafter referred only as to reproducing apparatuses) and a plurality of digital recording apparatuses (hereinafter referred only as to recording apparatuses).

[First Embodiment]

Figure 1:
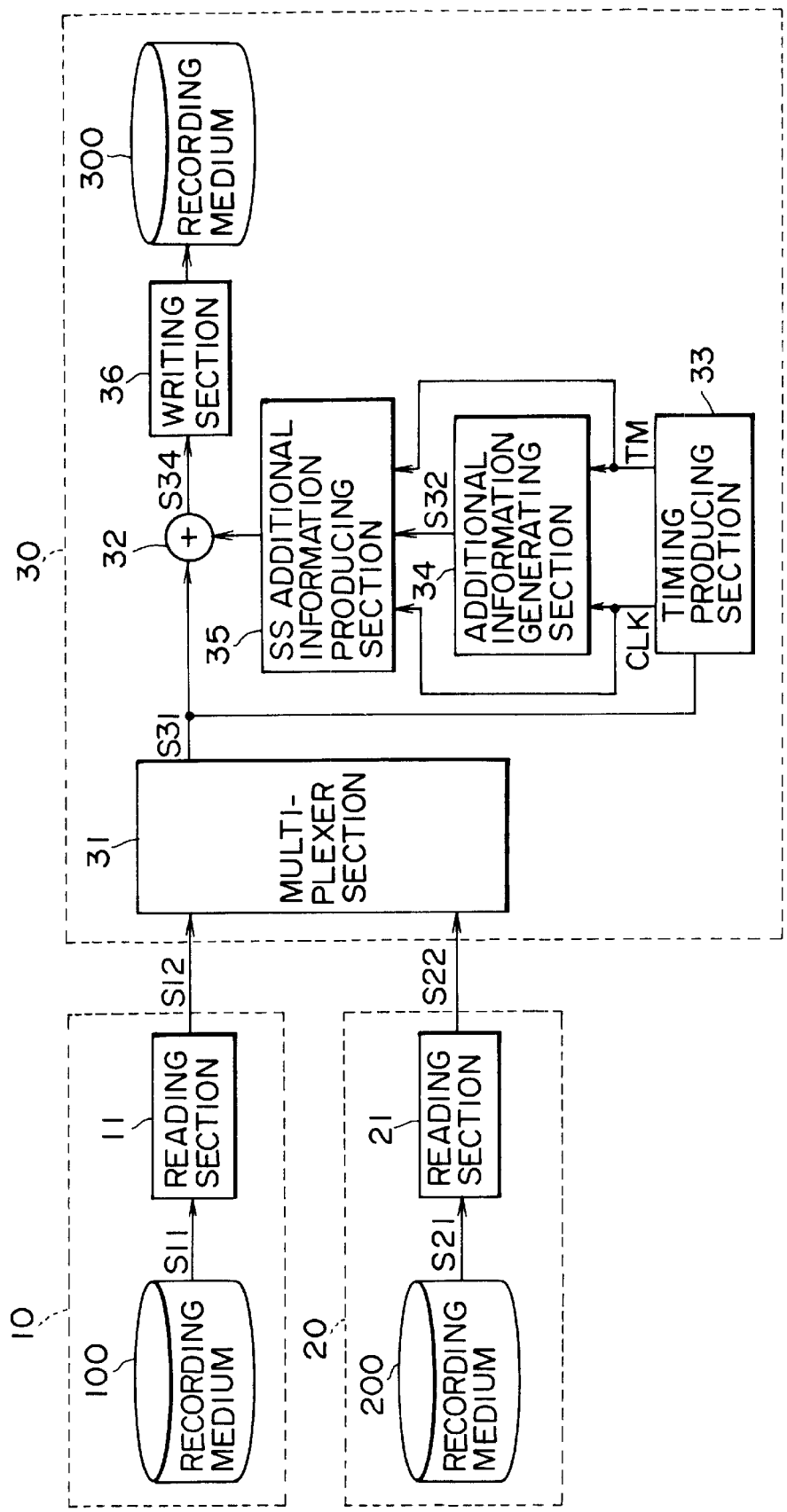
FIG. 1 is a block diagram for explaining an embodiment of an information signal authoring system of the present invention.

FIG. 1 is a block diagram for explaining an information signal authoring system as the first embodiment. As shown in FIG. 1, the authoring system of this first embodiment is composed of reproducing apparatuses 10, 20 and a recording apparatus 30.

The reproducing apparatuses 10, 20 will be explained first. As shown in FIG. 1, the reproducing apparatuses 10, 20 of this embodiment are respectively provided with a reading section 11 and a reading section 21 to reproduce and output the information signals recorded on the recording media 100, 200.

In this first embodiment, the recording media 100, 200 are discs such as, for example, CD-ROM and DVD which allows reading of information with the reproducing apparatuses 10 and 20.

These digital video signal and digital voice signal to be recorded in one recording medium are recorded to these recording media 100 and 200, for example, in such a manner that the former half among the digital video signal and digital voice signal for offering the image and voice like a movie is recorded to the recording medium 100, while the latter half thereof to the recording medium 200.

Explanation about the voice signal and voice signal of each apparatus will be omitted for simplifying the explanation and only the digital video signal as the information signal is recorded in the following explanation.

As shown in FIG. 1, the reading section 11 of the reproducing apparatus 10 forms a digital reproduced video signal S12 from the signal S11 obtained by reproducing the information in the recording medium 100 and then supplies this digital reproduced video signal S12 to the recording apparatus 30. In the same manner, the reading section 21 of the reproducing apparatus 20 forms a digital reproduced video signal S22 from the signal S21 obtained by reproducing the information of the recording medium 200 and then supplies this digital reproduced video signal S22 to the recording apparatus 30.

In this first embodiment, the recording apparatus 30 comprises, as shown in FIG. 1, a multiplexer section 31, a signal superimposing section 32, a timing producing section 33, an additional information generating section 34, an SS (here, SS is abbreviation of spectrum spread) additional information creating section 35 and a writing section 36. Moreover, the recording medium 300 is a disc such as CD-ROM and DVD to which the information signal such as digital video signal is written by this recording apparatus 30.

As will be explained below, the recording apparatus 30 records, after superimposing the spectrum spread additional information on the digital video signal, the relevant digital video signal, on which this spectrum spread additional information is superimposed, to the recording medium 300. Here, the additional information which has been spectrum spread and superimposed on the digital video signal is a duplication control information indicating contents of the duplication control for the relevant digital video signal such as duplication acknowledgment, duplication inhibition and limitation of duplication generation.

The digital reproduced video signals S12, S22 from the reproducing apparatuses 10, 20 are supplied to the multiplexer section 31 of the recording apparatus 30. The multiplexer section 31 forms one digital video signal S31 from the digital reproduced video signal S12 supplied thereto and the digital reproduced video signal S22. As explained, the multiplexer section 31 converts a plurality of digital reproduced signals supplied thereto into one bit stream. The digital video signal S31 output from the multiplexer section 31 is then supplied to a signal superimposing section 32 and a timing producing section 33.

The timing producing section 33 produces a timing signal TM and a clock signal CLK to be used for the process for generating the additional information to be added to the digital video signal S31 and the process for spectrum spreading the additional information.

Figure 2:
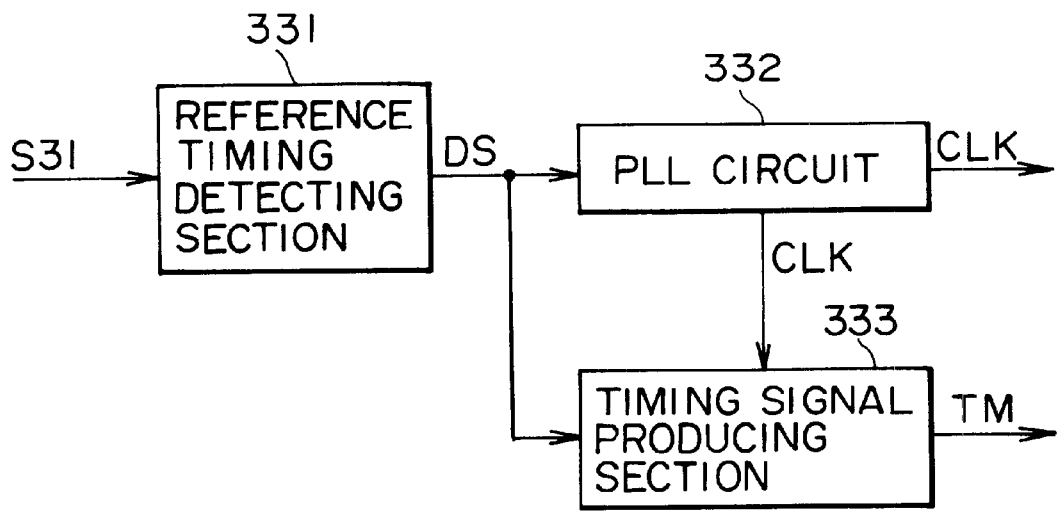
FIG. 2 is a block diagram for explaining a timing producing section of the recording apparatus of FIG. 1.

FIG. 2 is a block diagram for explaining the timing producing section 33 of the recording apparatus 30 of this first embodiment. As shown in FIG. 2, the timing producing section 33 comprises a reference timing detecting section 331, a PLL circuit 332 and a timing signal producing section 333.

The digital video signal S31 from the multiplexer section 31 is supplied to the reference timing detecting section 331 of the timing producing section 33. The reference timing detecting section 331 extracts the synchronous signal SY as the reference timing signal from the digital video signal S31 and then supplies this signal to the PLL circuit 332 and timing signal producing section 333.

The PLL circuit 332 produces the clock signal CLK synchronized with the digital video signal S31 on the basis of the synchronous signal SY from the reference timing detecting section 331. This clock signal CLK is supplied to the timing signal producing section 333 and also to each section using this clock signal CLK such as an additional information generating section 34 and an SS additional information producing section 35 which will be explained later.

The timing signal producing section 333 produces and outputs, based on the synchronous signal SY and clock signal CLK from the reference timing detecting section 331, the timing signal TM and the other timing signals used in the additional information generating section 34 and the SS additional information producing section 35 which will be explained later.

The timing signal TM produced by the timing signal producing section 333 is synchronized with the synchronous signal SY from the reference timing detecting section 331 and is used as a reset (initialization) signal indicating the timing for generating, from the beginning, the additional information stream and the PN code stream having the predetermined code pattern.

For example, when the vertical synchronous signal is extracted as the reference timing signal in the reference timing detecting section 331 of the timing producing section 33, the clock signal CLK synchronized with the vertical synchronous signal from the reference timing detecting section 331 is produced in the PLL circuit 332.

Moreover, in the timing signal producing section 333, the timing signal TM synchronized with the vertical synchronous signal used as the reference timing signal is generated in such a manner, for example, that one vertical section (one field) is defined as one period on the basis of the vertical synchronous signal from the reference timing detecting section 331 and the clock signal CLK from the PLL circuit 332.

The timing signal TM and the clock signal CLK produced in the timing producing section 33 as explained above are then supplied, as shown in FIG. 1, to the additional information generating section 32 and SS additional information generating section 35.

The additional information generating section 34 is provided, for example, with a memory storing the additional information to generate, in every timing indicated by the timing signal TM, the additional information of the bits as low as one or two bits instructing duplication inhibition and duplication acknowledgment, etc. using the timing signal TM and clock signal CLK from the timing producing section 33 and outputs, in every bit, this additional information using a predetermined number of clocks in synchronization with the clock signal CLK to generate the additional information S32 and then supplies this information to the SS additional information producing section 35.

The SS additional information producing section 35 receives the additional information stream S32, timing signal TM and clock signal CLK to produce the SS additional information S33 as the spectrum spread signal by spectrum spreading the additional information stream S32.

Figure 3:
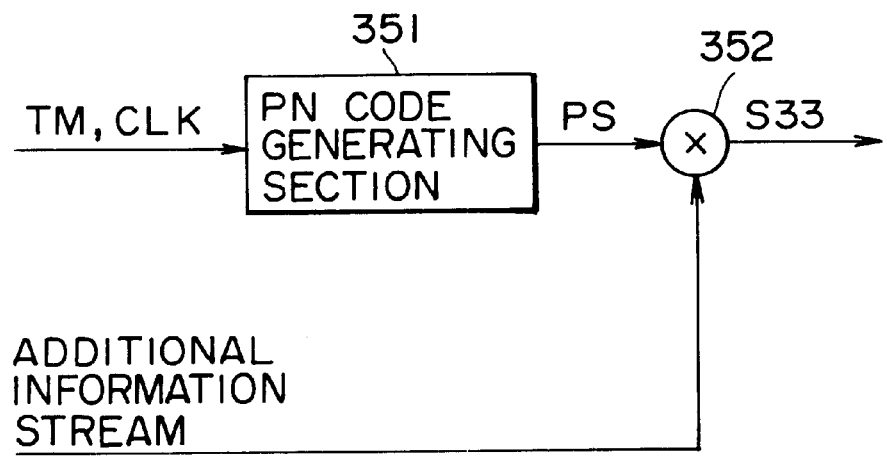
FIG. 3 is a block diagram for explaining an SS additional information producing section of the recording apparatus of FIG. 1.

FIG. 3 is a block diagram for explaining the SS additional information producing section 35 of this first embodiment. As shown in FIG. 3, the SS additional information producing section 35 is provided with a PN (Pseudorandom Noise) code generating section 351 and a multiplying section 352.

The PN code generating section 351 generates the PN code stream PS on the basis of the clock signal CLK and timing signal TM. Namely, in this first embodiment, the PN code generating section 351 produces, from the beginning, the PN code stream PS in every supply timing of the timing signal TM in synchronization with the clock signal CLK. The PN code stream PN produced in the PN code generating section 351 is supplied to the multiplying section 352.

Moreover, as shown in FIG. 3, the additional information stream S32 is supplied to the multiplying section 352 from the additional information generating section 34.

The multiplying section 352 spreads the spectrum of the additional information stream S32 using the PN code stream PS. This multiplying section 352 provides the spectrum spread signal (SS additional information) S33 as the spectrum spread additional information. Namely, the multiplying section 352 has a function to convert the additional information as the narrow band and high level duplication control information into the wide band and low level SS additional information S33, as will be explained later, by spreading the spectrum of the additional information stream S32 using the PN code stream PS.

Figure 4:
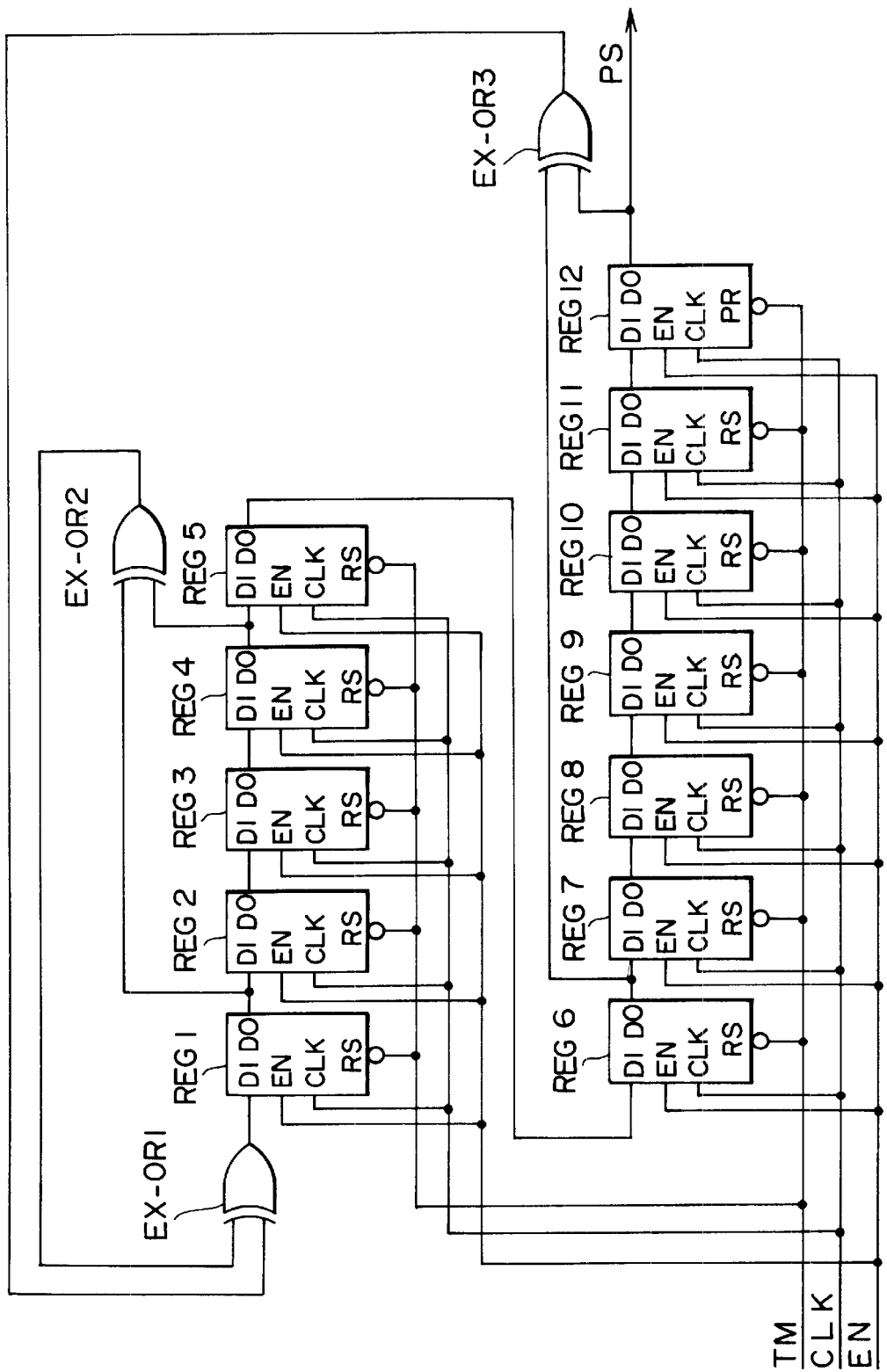
FIG. 4 is a block diagram for explaining an example of the PN code generating section as a part of FIG. 3.

FIG. 4 shows a structure example of the PN code generating section 351 shown in FIG. 3. The PN code generating section 351 of this example is composed of 12 D-flip-flop circuits REG1 to REG15 forming the shift registers of 12 stages and exclusive OR circuits EX-OR1 to EX-OR3 for calculating adequate tap output of this shift register. The PN code generating section 351 shown in FIG. 4 produces, as explained above, the M series PN code stream PS on the basis of the timing signal TM and clock signal CLK.

In FIG. 4, the enable signal EN activates the PN code generating section 5 and this signal is produced, in this first embodiment, when the power of the recording apparatus 30 shown in FIG. 1 is turned ON, and is then supplied to the PN code generating section 351.

As explained above, the SS additional information S33 obtained from the SS additional information producing section 35 is then supplied to a signal superimposing section 32.

The signal superimposing section 32 receives a digital video signal S31 and an SS additional information S33 to form a digital video signal S34 to which the digital SS additional information S33 is superimposed.

The signal superimposing section 32 superimposes, when the digital video signal S31 is, for example, the 10 bits source in which the image of one pixel is expressed by 10 bits, the SS additional information S33 to the least significant bit (LSB) of the 10-bit digital video signal or to the $9^{th}$ bit next to the least significant bit. As explained above, the signal superimposing section 32 superimposes the SS additional information S33 in the same time and same frequency on the digital video signal S31.

Moreover, in this case, the signal superimposing section 32 superimposes the SS additional information S33 on the digital video signal S31 with the signal power lower than the dynamic range of the digital video signal S31 so that the SS additional information does not deteriorate the digital video signal S31. Thereby, the digital video signal S34 formed by superimposing the SS additional information S33 to the digital video signal S31 in the signal superimposing section 32 is supplied to the writing section 36.

The writing section 36 receives supply of the digital video signal S34 on which the digital SS additional information S33 is superimposed and then converts this signal to the digital video signal suitable for recording in view of writing this digital video signal for recording to the recording medium 300. Thereby, the recording medium 300 in which digital video signal, which is the digital video signal being formed from the digital video signal recorded in the recording media 100, 200 and superimposing the spectrum spread additional information, is recorded can be produced.

As will be explained below, since the additional information superimposed on the digital video signal recorded in the recording medium 300 is spectrum spread, the relevant digital video signal does not deteriorate the reproduced image and alteration and erasing of such digital video signal are impossible.

Even when a large amount of recording media having recorded the information signal through the mastering using the recording medium 300 has been produced, the digital video signal to which the spectrum spread additional information indicating contents of the duplication control is superimposed can be recorded to the produced recording media.

Therefore, on the occasion of reproducing the digital video signal recorded on the produced recording medium and recording (duplicating) the digital video signal reproduced from the produced recording medium to the other recording medium, it is surely possible to extract the spectrum spread additional information superimposed to the digital video signal and then execute the duplication preventing control depending on the extracted additional information.

FIG. 5 shows the spectra for indicating relationship between the additional information which is a duplication control information and an information signal which is a video signal in this example. The additional information includes a small amount of information and is a so-called low bit rate signal of the frequency band as narrow as shown in FIG. 5A. When this signal is subjected to the spectrum spread, this signal is changed to the signal of the frequency band as wide as shown in FIG. 5B. In this case, the level of spectrum spread signal becomes small and inversely proportional to expansion of the frequency band.

Figure 5A:
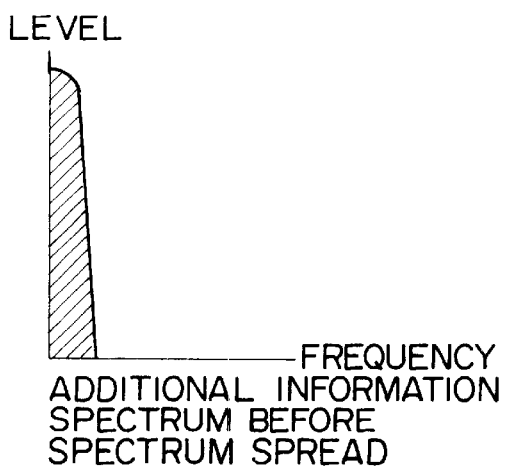
FIGS. 5A to 5D are diagrams showing a relationship of the SS additional information (duplication control information) and information signal using the spectra.
Figure 5B:
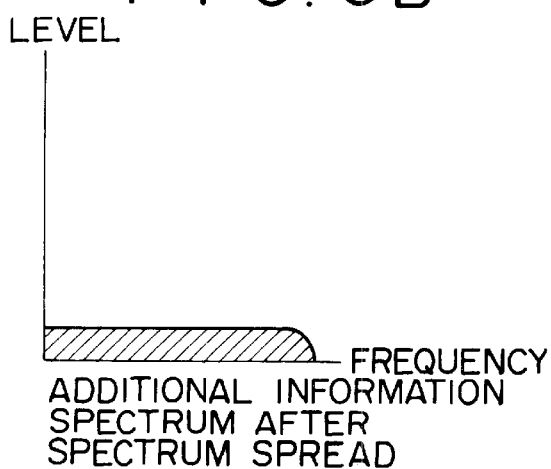
Figure 5C:
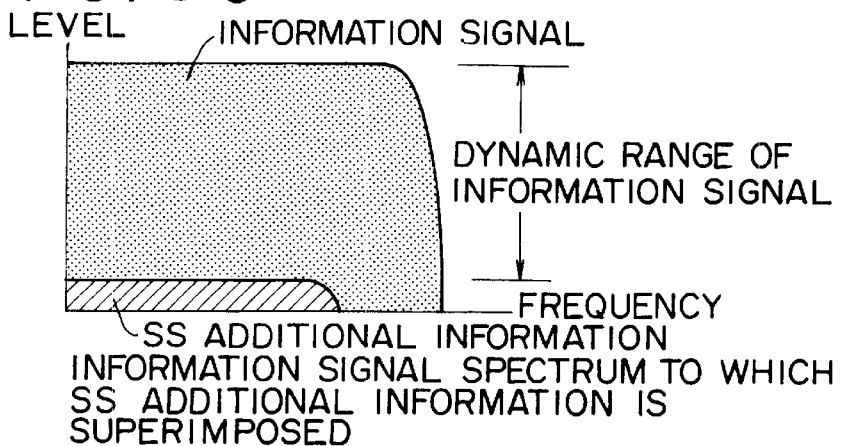

Here, the spectrum spread signal, namely, the SS additional information S33 which is the SS duplication control information is superimposed on the information signal in the signal superimposing section 32. In this case, as shown in FIG. 5C, the SS additional information S33 is superimposed in the level which is smaller than the dynamic range of the video signal as the information signal. This method of superimposition does not almost deteriorate the information signal. Accordingly, when the video signal on which the SS additional information is superimposed is supplied to the monitor receiver to reproduce the image, the displayed image does not include any influence of the SS additional information as the good reproduced image.

Figure 5D:
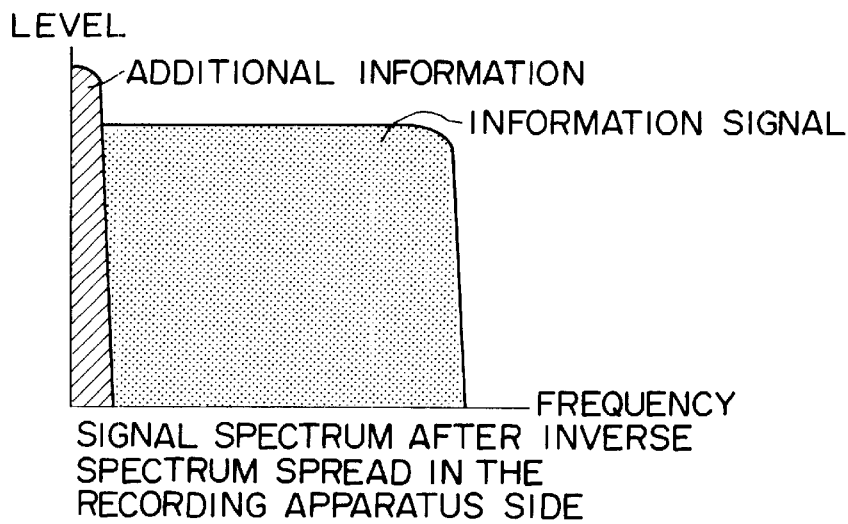

However, as will be explained later, since the SS additional information is detected in the recording side, when the inverse spectrum spread is executed, the SS additional information which is the SS duplication control information is recovered again as the narrow band signal as shown in FIG. 5D. The power of the duplication control information after the inverse spectrum spread becomes higher than the information signal and can be detected by giving a sufficient band spread coefficient.

In this case, the SS additional information S33 superimposed to the video signal is superimposed in the same time and same frequency as the video signal. Therefore, such recovered SS additional information cannot be erased and corrected only with use of a frequency filter or with simple replacement of the information.

It is now possible, under the condition that the digital video signal is never deteriorated and alteration and erasing cannot be done easily, to produce a recording medium 300 in which the digital video signal on which the additional information indicating contents of the duplication preventing control is superimposed is recorded, and the digital video signal on which the additional information indicating contents of the duplication preventing control is superimposed can also be recorded to many recording media produced from the recording medium 300 of the first duplication generation.

In the case of reproducing the digital video signal from the recording medium produced as explained above and recording the reproduced digital video signal into the other recording medium, the spectrum spread and superimposed additional information can be extracted and the duplication preventing control can be realized depending on the extracted additional information.

When the spectrum spread and superimposed additional information is to be extracted from the digital video signal, the additional information which is spectrum spread and superimposed to the relevant digital video signal can be extracted by synchronously generating the PN code stream which is the same as the PN code stream spectrum spreading the additional information and then executing the inverse spectrum spread using such PN code stream.

As explained above, the information signal authoring system of the first embodiment is capable of superimposing the spectrum spread additional information indicating contents of the duplication control on the digital video signal to be recorded to the recording medium in the case of producing a recording medium to which the digital video signal is recorded.

Moreover, as explained previously, since the additional information on be superimposed to the digital video signal is spectrum spread and is superimposed as the wide band and low level signal, this additional information never deteriorates the video signal which is reproduced by the relevant digital video signal.

In addition, since the spectrum spread additional information is superimposed on the digital video signal in the same time and same frequency, the additional information cannot be altered and erased only with a frequency filter or replacement of the information signal. Moreover, as explained above, since the spectrum spread additional information is superimposed on the digital video signal in the same time and same frequency, even if the digital video signal on which the spectrum spread additional information is superimposed is converted to an analog signal by the D/A conversion, the additional information is never erased.

Therefore, it is now possible to extract the additional information superimposed on the digital video signal and surely execute the duplication control depending on this additional information at the time of reproduction and duplication of the digital video signal to which the spectrum spread additional information is superimposed.

[Second Embodiment]

Figure 6:
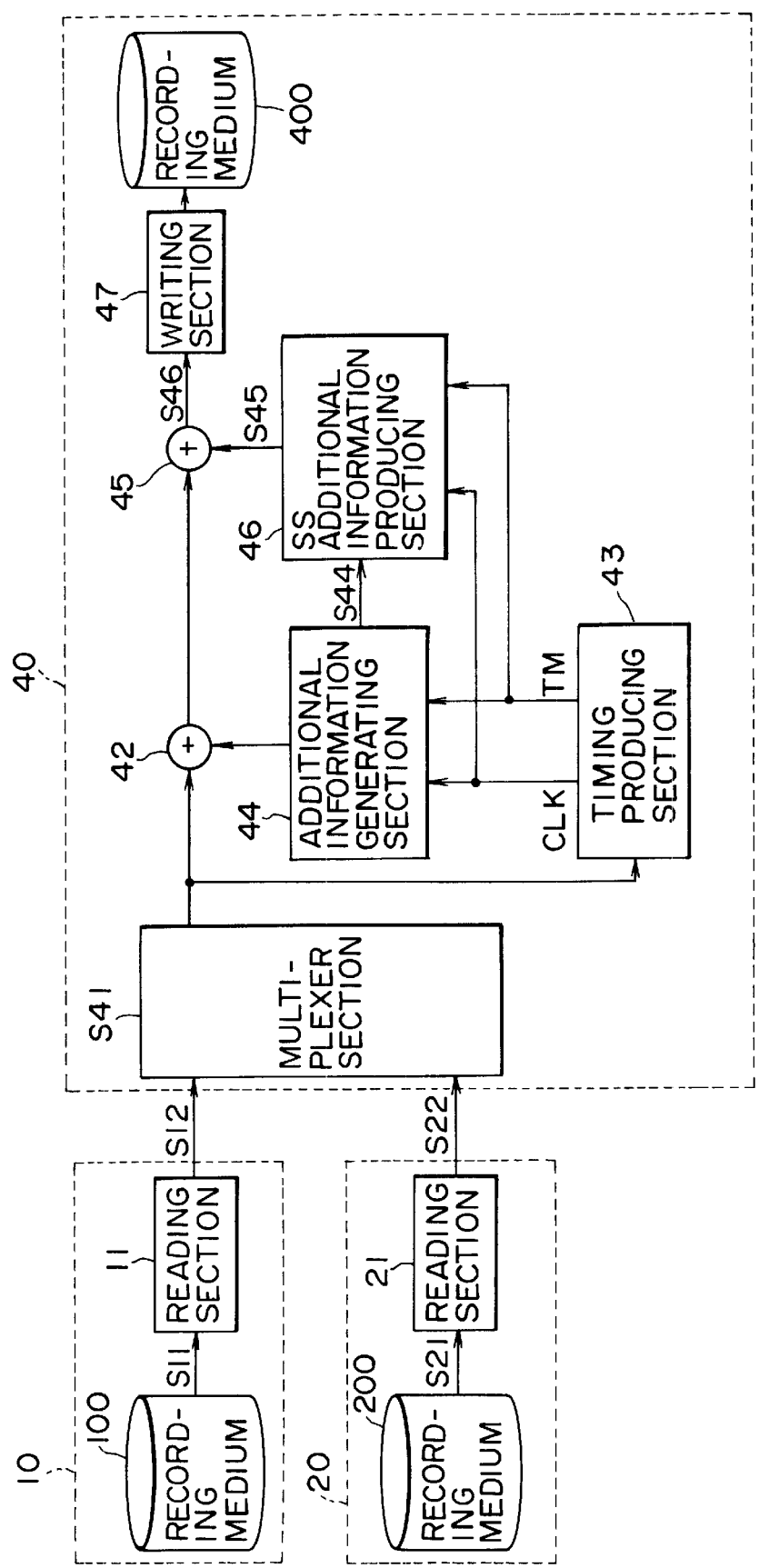
FIG. 6 is a block diagram for explaining the other example of an embodiment of an information signal authoring system of the present invention.

FIG. 6 is a block diagram for explaining an information signal authoring system of the second embodiment. This second authoring system can superimpose the spectrum spread additional information on the information signal to be recorded to a recording medium and also can add the additional information by a method different from such adding method.

As shown in FIG. 6, the information signal authoring system of this second embodiment is provided with reproducing apparatuses 10, 20 and a recording apparatus 40. The reproducing apparatuses 10, 20 and recording media 100, 200 are similar to the reproducing apparatuses 10, 20 and recording media 100, 200 used in the first embodiment. Like the first embodiment, the reproducing apparatuses 10, 20 form the digital reproduced video signals S12, S22 from the information recorded in the recording media 100, 200 and then supplies these signals S12, S22 to the recording apparatus 40.

Next, the recording apparatus 40 of the second embodiment will be explained. As shown in FIG. 6, the recording apparatus 40 is provided with a multiplexer section 41, signal superimposing sections 42, 45, a timing producing section 43, an additional information generating section 44, an SS additional information producing section 46 and a writing section 47. Moreover, a recording medium 400 is, for example, a disc such as CD-ROM or DVD to which the information signal such as digital video signal is written by this recording apparatus.

As will be explained below, the recording apparatus 40 adds and superimposes the non-spectrum spread additional information as the first additional information and the spectrum spread additional information as the second additional information to the digital video signal and then records the digital video signal to the recording medium 400.

In this second embodiment, the first and second pieces of additional information are duplication control information signals indicating contents of the duplication control for the relevant digital video signal such as duplication acknowledgment, duplication inhibition and limitation on duplication generation as in the case of the additional information of the first embodiment.

In the second embodiment, the first additional information an be recorded to the TOC (Table of Contents) at the most internal circumference of the recording medium (disc) 400 in the second embodiment and to the track area called a directory and also can be inserted for the purpose of recording in the different recording area of the tracks where video data and voice data can be recorded. However, the example explained below corresponds to the latter case and therefore the first additional information is added by insertion to the video data.

The digital reproduced video signals S12, S22 from the reproducing apparatuses 10, 20 are supplied to the multiplexer section 41 of the recording apparatus 40. The multiplexer section 41 forms, like the multiplexer section 31 of the first embodiment explained above, the digital video signal S41 to be recorded on the recording medium 400 from the digital reproduced video signal S12 and the digital reproduced video signal S22 supplied to the multiplexer section 41. The digital video signal S41 formed here is then supplied to the signal superimposing section 42 and timing producing section 43.

The timing producing section 43 is formed in the same manner as the timing producing section 33 of the first embodiment explained above to generate the timing signal TM and clock signal CLK to be used for the processes to generate the additional information to be added to the digital video signal S41 and to spread the spectrum of the additional information. Therefore, the timing producing section 43 of this second embodiment will be explained under the assumption that it has the same structure as the timing producing section 33 of the first embodiment explained in regard to FIG. 2.

Namely, the timing producing section 43 is provided, as shown in FIG. 2, with a reference timing detecting section 331, a PLL circuit 332 and a timing signal producing section 333. The reference timing detecting section 331 of the timing producing section 33 extracts the synchronous signal SY as the reference timing signal from the digital video signal S41 supplied from the multiplexer section 41. This synchronous signal SY is supplied to the PLL circuit 332 and timing signal producing section 333.

The PLL circuit 332 produces the clock signal CLK synchronized with the digital video signal S41 on the basis of the synchronous signal SY from the reference timing detecting section 331 and then supplies this synchronous signal CLK to the timing signal producing section 333. Moreover, the clock signal CLK is also supplied, as will be explained later, to each section of this recording apparatus 40 using this clock signal CLK such as the additional information generating section 44 and SS additional information producing section 46.

The timing signal producing section 333 produces and outputs the timing signal TM and other various timing signals used in the additional information generating section 44 and SS additional information producing section 46 on the basis of the synchronous signal SY and clock signal CLK from the reference timing detecting section 331.

Here, the timing signal TM is used, as explained previously in regard to the first embodiment, as the reset (initialization) signal which is synchronized with the synchronous signal SY from the reference timing detecting section 321 and indicates the timing to generate, from the beginning, the PN code stream having the predetermined code pattern.

As explained above, the timing signal TM and clock signal CLK produced by the timing producing section 43 are then supplied to the additional information generating section 44 and SS additional information producing section 46 as shown in FIG. 6.

The additional information generating section 44 generates, like the additional information generating section 34 of the first embodiment explained previously, the additional information S42 of the bit as low as 1 bit or 2 bits to instruct duplication inhibition and duplication acknowledgment in every timing indicated by the timing signal TM and using the timing signal TM and clock signal CLK from the timing producing section 43 and then supplies such additional information S42 to the signal superimposing section 42 and also produces the additional information stream S44 by outputting the generated additional information S42 as many as the predetermined number of clocks in synchronization with the clock signal CLK in every bit and then supplies this additional information stream S44 to the SS additional information producing section 46.

The signal superimposing section 42 additionally adds the additional information S42 to the video data of the digital video signal S41. For example, this additional information S42 is added, by insertion, to the header section of the data in unit of block and the trailer section of the data in unit of block. As explained previously, the additional information S42 produced in the additional information generating section 44 is supplied in every timing indicated by the timing signal TM. Therefore, the signal superimposing section 42 of the second embodiment additionally adds the additional information to the video data of the digital video signal S41 every kind the additional information S42 is supplied.

For example, in such a case that the additional information S42 is generated in every field depending on the timing signal TM and it is then supplied to the signal superimposing section 42, the signal imposing section 42 adds, by insertion, the additional information to the video data of the digital video signal S41 in every field as the additional information generation timing. The digital video signal S43 formed by additional insertion of the additional information S42 is then supplied to the signal superimposing section 45.

Meanwhile, the SS additional information producing section 46 is structured in the same manner as the SS additional information producing section 35 of the first embodiment explained previously and receives supply of the additional information stream S44, timing signal TM and clock signal CLK and then produces the SS additional information S45 by spreading the spectrum of the additional information stream S44. Therefore, the SS additional information producing section 46 of the second embodiment is explained as including the PN code generating section 351 and multiplying section 352 as shown in FIG. 3.

As shown in FIG. 3, the PN code generating section 351 produces, from the beginning, the PN code stream PS having the predetermined code pattern in synchronization with the clock signal CLK in every timing of supply of the timing signal TM. The PN code stream PS produced by the PN code generating section 351 is then supplied to the multiplying section 352.

The multiplying section 352 spreads, using the PN ode stream, the spectrum of the additional information stream S44 from the additional information generating section 44 supplied to the multiplying section 352. From this multiplying section 352, the spectrum spread signal (SS additional information) S45, which is the spectrum spread additional information, can be obtained. The SS additional information S45 formed by this SS additional information producing section 46 is then supplied to the signal superimposing section 46.

The signal superimposing section 45 superimposes, like the signal superimposing section 32 of the first embodiment explained previously, the SS additional information S45 on the digital video signal S43 in the same time and same frequency and then forms the digital video signal S46 to which the SS additional information is superimposed. The digital video signal S46 formed herein is then supplied to the writing section 47.

The writing section 47 converts the digital video signal S45, to which the additional information S42 is added and spectrum spread additional information S45 is superimposed, into the digital video signal suitable for recording and then writes this digital video signal for the recording into the recording medium 400. Thereby, there is provided a recording medium 400 having recorded the digital video signal to which the additional information S42 is added and the spectrum spread additional information S45 is superimposed.

Therefore, if any one of the first and second additional information signals is erased, for example, the duplication control can be done by utilizing the remaining additional information because the other additional information is still maintained. Moreover, when any one of the first and second additional information signals to be added does not exist and when contents of the first and second additional information signals are different from each other, it can be judged that it is probable that the additional information has been erased or altered. In this case, as will be explained later, the duplication control, for example, inhibition of duplication can be realized.

As explained, when the same information is added to the digital video signal by different methods, if it is attempted to alter or erase the additional information added to this digital video signal, the first additional information and the second additional information must be altered and erased respectively in the same manner, but it is very difficult to alter and erase both first and second additional information signals in the same manner.

Particularly, the second additional information is spectrum spread, as in the case of the additional information in the first embodiment explained previously, and is then superimposed in the same time and same frequency on the digital video signal. Therefore, the additional information cannot be altered and erased only with a frequency filter or with replacement of the information signal.

Therefore, in the case of adding and superimposing the additional information signals of the same content to the digital video signal with different adding methods as explained above, strength of the additional information to the digital video signal can be enhanced and reliability of the additional information superimposed to the digital video signal can be improved.

Moreover, when the additional information signals of the same contents are added or superimposed to the digital video signal with different methods, more detail reproduction control and duplication control can be realized depending on the information obtained by detecting such first and second additional information signals in the reproducing apparatus for reproducing the relevant digital video signal and the recording apparatus which receives supply of the video signal from the reproducing apparatus for reproducing such digital video signal to duplicate such video signal to the other recording medium.

Namely, in the reproducing apparatus for reproducing the digital video signal to which the first and second additional information signals are added and superimposed or in the recording apparatus for duplicating such digital video signal, the reproduction control and duplication control can be done depending on the detected first and second additional information signals, existence of additional information not detected or the information indicating difference in contents of the duplication control indicated by the detected first and second additional information signals.

For example, as explained previously, when only the spectrum spread and superimposed second additional information is detected and the first additional information is not detected, or when the first and second additional information signals are detected but contents of the duplication control indicated by such additional information signals are different with each other, it may be assumed with higher possibility that the additional information is altered or erased. Therefore, it is possible to effectuate the control to inhibit the reproduction or duplication process of the relevant digital video signal.

Moreover, when the first and second additional information signals are detected but the contents of duplication control indicated by these signals are different from each other, the duplication control may be done depending on the additional information which may be thought to be more accurate, for example, on the additional information having strict contents of duplication control.

In addition, when the additional information signals of different contents are added and superimposed on the digital video signal with different methods, the amount of additional information to be superimposed to the digital video signal can be increased. For example, it is possible that the copyright information which can identify the copy holder of the digital video signal is added as the first additional information and the additional information obtained by spectrum spread of the duplication control information indicating contents of the duplication control is also added as the second additional information.

[Other Example of SS Additional Information Producing Section]

In the embodiments explained above, as is explained in regard to FIG. 3, the SS additional information producing sections 35, 46 spread the spectrum of the additional information of the bit as low as one bit or 2 bits with only one PN code to produce the SS additional information signals S33, S45. However, as will be explained below, it is also possible that the PN code itself or a mixture of the PN code and the other code is superimposed, in place of spectrum spread of the additional information, to the digital video signal as the additional information indicating contents of the duplication control.

In the following explanation, the additional information FS corresponds to the additional information of one bit or two bits produced in the additional information producing sections 34, 44 explained previously, while the SS additional information SF to the spectrum spread signal (SS additional information) produced in the SS additional information producing sections 35, 46.

Figure 7:
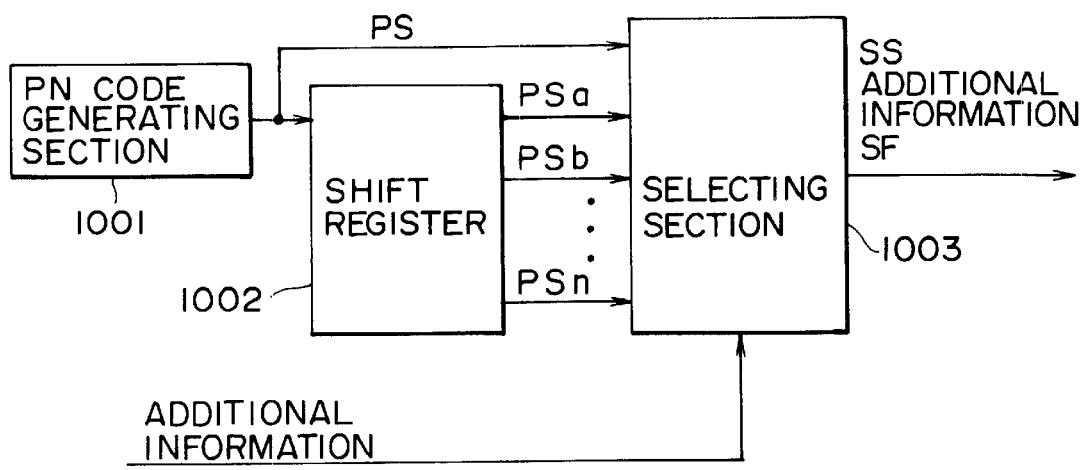
FIG. 7 is a block diagram for explaining the other example of the SS additional information producing section.

An example of FIG. 7 is an embodiment of the SS additional information producing section utilizing the PN codes of different phases.

In this example, the PN code PS output from the PN code generating section 1001 is supplied to the selecting section 1003 and also to a shift register 1002. The shift register 1002 outputs the PN codes PSa, PSb, . . . , PSn having sequentially different phases which are obtained from the PN code PS through sequential time shift with the clock signal and then supplies these signals to the selecting section 1003

The additional information FS is supplied to the selecting section 1003 as the selection control signal. The selecting section 1003 selects, from the PN codes PS, PSa, PSb, . . . , PSn in a plurality of phases, only one PN code of a certain phase depending on the control contents, namely duplication inhibition or duplication acknowledgment, etc. of the additional information FS as the selection control signal and outputs this selected PN code as the SS additional information SF.

Figure 8:
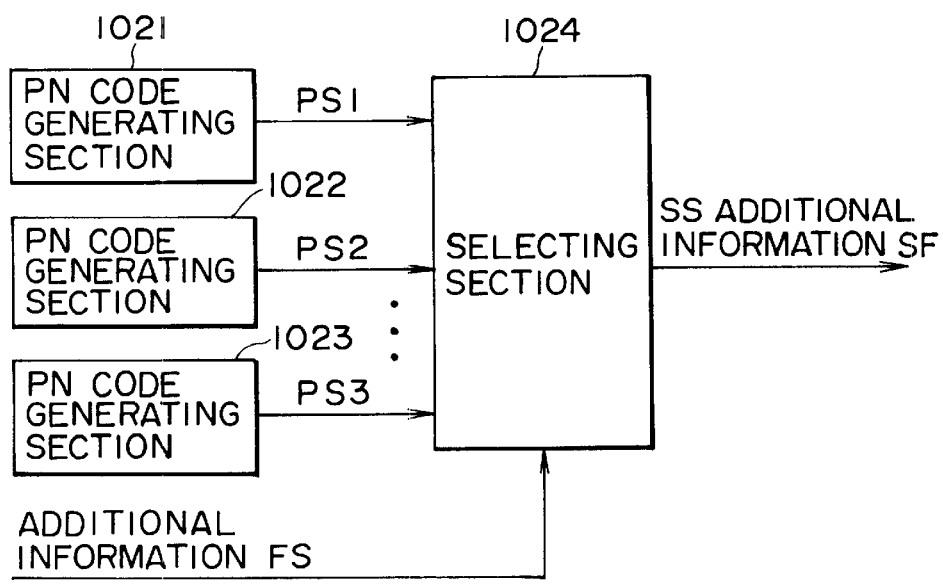
FIG. 8 is a block diagram for explaining the other example of the SS additional information producing section.

An example of FIG. 8 is an embodiment of the SS additional information producing section when the PN codes of different series are used.

In this example, a plurality of PN code generating sections 1021, 1022, ..., 1023 are provided to produce the PN codes PS1, PS2, ..., PS3 of different series. Outputs of the PN code generating sections 1021, 1022, ..., 1023 are input to the selecting section 1024.

The additional information FS is supplied to the selecting section 1024 as the selection control signal. The selecting section 1024 selects only one PN code of a certain series from a plurality of PN codes of different series PS1, PS2, ..., PS3 depending on control contents, namely duplication inhibition or duplication acknowledgment, etc. of the additional information FS as the selection control signal and then outputs this selected PN code as the SS additional information SF.

An example of FIG. 9 is an embodiment of the essential portion of the SS additional information producing/superimposing apparatus when a kind of PN code and a plurality of orthogonal codes are used.

In this example, one PN code producing section 1041 and orthogonal code producing sections 1042, 1043, ..., 1044 to produce different orthogonal codes are provided. The output PN code PS of the PN code producing section 1041 is input to the multiplying section 1046. Moreover, different orthogonal codes from the orthogonal code producing sections 1042, 1043, ..., 1044 are input to the selecting section 1045. In addition, the additional information FS is supplied to the selecting section 1045 as the selection control signal.

The selecting section 1045 outputs only one orthogonal code among a plurality of orthogonal codes to the multiplying section 1046 depending on the control contents, namely duplication inhibition or duplication acknowledgment, etc. of the additional information FS as the selection control signal. The multiplying section 1046 multiplies the PN code PS and the selected orthogonal code and outputs the multiplying result as the SS additional information SF.

[In Regard to Detection of SS Additional Information Corresponding to the Other Example of the SS Additional Information Producing Section]

When the SS additional information producing section shown in FIG. 7, FIG. 8 and FIG. 9 is used, the spectrum spread additional information can be detected as explained below.

FIG. 10 shows the example of the SS additional information detecting section to detect the additional information from the video signal on which the SS additional information using the PN code of different phase shown in FIG. 7 is superimposed.

In the SS additional information detecting section of this example, the digital reproduced video signal (receiving signal) to which the SS additional information is superimposed is then input to the PN code detecting section 1061. This PNcode detecting section 1061 detects the timing of the FN code and inputs the result to the additional information producing section 1062. The additional information producing section 1062 identifies contents of the duplication control instructed by the additional information due to the difference of the timing of the PN code and produces and outputs the additional information to be supplied to the recording control section depending on the result of identification.

An example of FIG. 11 is the example of the SS additional information detecting section to detect the additional information from the video signal to which the SS additional information using the code combining the PN code of different series of FIG. 8 or a kind of PN code of FIG. 9 and a plurality of orthogonal codes.

In the SS additional information detecting section of this example, the digital video signal (receiving signal) to which the SS additional information is superimposed is input to the PN code detecting sections 1081, 1082, ..., 1083. The PN code detecting sections 1081, 1082, ..., 1083 respectively detect the code multiplying different PN codes or a kind of the PN code and the different orthogonal codes. An output thereof is input to the additional information producing section 1084. This additional information producing section 1084 identifies a kind of the additional information depending on the code stream detected and produces and outputs the additional information to be supplied to the recording control section depending on the result of identification.

When the SS additional information producing section and SS additional information detecting section explained above are used, it is also possible to simultaneously add a plurality of kinds of additional information by using the code combining the PN code of different phase or orthogonal code and the PN code in the spectrum spread to produce the additional information indicating contents of duplication control to be superimposed.

In the first and second embodiments explained above, the PN code of the M series is used but the code used is not limited thereto. For example, various kinds of spread codes such as the code of the Gold code series may be used.

Moreover, in the first and second embodiments explained above, the timing signal and clock signal are produced using the synchronous signal extracted from the digital video signal as the reference signal, but the method of producing the timing signal and clock signal is not limited thereto.

The synchronous signal of the digital video signal is never used as the reference signal and it is also possible to administrate and control the various timings in each section of the information signal authoring system of the first and second embodiments explained above, for example, with the system controller.

Moreover, in the first and second embodiments explained above, when encoding of the digital video signal as the information signal and compression of signal are necessary, these processes can be realized in the reading sections 11, 21 of the reproducing section and writing sections 36, 47 of the recording apparatus.

Moreover, in the case of compressing the digital video signal, for example, in the case of recording 8 bits of the 10 bits source, the SS additional information is superimposed in the stage of the 10 bits before compression of signal. Thereby, even if the compressed digital video signal is expanded, the SS additional information is never deteriorated or erased.

In addition, for example, when compression of the signal is executed to result in deterioration of the S/N ratio of the digital video signal, the SS additional information can also be summed up to a more significant bit without limitation to the less significant bit such as the least significant bit (LSB).

In the above explanation, the additional information generating sections 34, 44 of the first and second embodiments generate the additional information but the present invention is not limited thereto. For example, it is also possible to produce and output the additional information depending on an instruction input by an operator of the information signal authoring system of the first and second embodiments explained above.

Moreover, in the first and second embodiments explained above, two units of the reproducing apparatuses supply the digital video signal to the recording apparatuses 30, 40, but the present invention is not limited thereto. It is also possible to supply a plurality of digital video signals to the recording apparatuses 30, 40 depending on capability of the multiplexer section.

It can also be thought, as the timing for adding and superimposing the additional information on the digital video signal as the information signal, that the additional information is added and superimposed in the producing process of the recording medium, after the mastering process, for example, the process of producing the original recording medium for the mastering process using the authoring system.

However, in the first and second embodiments explained above, the additional information can be added and superimposed on the digital video signal during the so-called authoring process in which a digital video signal to be recorded to one recording medium is formed from a plurality of digital video signal recorded in a plurality of recording media and it is then recorded to the recording medium to produce the recording medium to which the original digital video signal to be used for the mastering is recorded.

Therefore, since the digital video signal to which the additional information is added can surely be recorded to the recording medium which has been produced based on the recording medium produced using the authoring apparatus of the first and second embodiments explained above, it never happens that the additional information is forgot ten to be added.

In the above example, the digital video signal is used as the information signal, but the present invention can be applied for various kinds of information signals such as audio signal or computer program. In addition, the information signal is not limited to the digital signal and may be an analog signal.

In addition, the additional information is not limited to the duplication control information and can be added and superimposed on various kinds of information such as copy right information and incorporated information.

Moreover, the recording medium 100, 200, 300, 400 is assumed as the disc such as CD-ROM and DVD in the first and second embodiments explained above, but the recording medium is never limited to such CD-ROM or DVD.

As the recording medium, various kinds of recording media such as magnetic recording media including optical disc, magneto-optical disc, magnetic disc or video tape maybe used.

As explained previously, according to the information signal recording apparatus of the present invention, since the additional information is superimposed to the information signal in the same time and same frequency as the information signal in a wider frequency range through the spectrum spread process, the additional information cannot be altered or erased only with use of the frequency filter or with simple replacement of the information signal. In addition, even when the information signal is a digital signal and it is converted to the analog signal, the additional information can be protected from missing. As explained above, the remaining coefficient of the additional information to be superimposed to the information signal can be enhanced.

Moreover, since the additional information is spectrum spread to become the wide band and low level signal, the additional information can be superimposed on the information signal without deterioration thereof.

Furthermore, according to the information signal recording apparatus of the present invention, reliability and strength of the additional information to be added to the information signal can be enhanced by adding and superimposing the additional information of the same contents with different adding methods. Moreover, the additional information of different contents can also be added to the information signal a different adding method. In this case the, total amount of the additional information to be added to the information signal can be increased.

Moreover, according to the information signal recording apparatus of the present invention, a plurality of additional information signals may easily be superimposed simultaneously on the same information signal for utilization by using the spread codes of different phases or different codes such as spread code and orthogonal code.

Moreover, according to the information signal recording apparatus of the present invention, since the spectrum spread additional information is superimposed on an information signal in the low level, it is possible for the additional information to give no influence on the information signal such as deterioration of the relevant information signal.

In addition, according to the information signal recording apparatus of the present invention, on the occasion of inverse spectrum spread, the additional information can be extracted quickly by synchronizing, within a short period of time, the spread code in which the additional information is spectrum spread and the spread code for inverse spectrum spread.

What is claimed is:

1. An apparatus for transmitting a signal, comprising:
   code generating means for generating a code;
   additional information signal producing means for producing a high level narrow band additional information signal;
   processing means for processing said high level narrow band additional information signal using said code to produce a low level wide band additional information signal;
   first signal superimposing means for superimposing said high level narrow band additional information signal on said signal;
   second signal superimposing means for superimposing said low level wide band additional information signal on said signal having said high level narrow band additional information signal superimposed thereon; and
   transmitting means for transmitting an output from said second signal superimposing means.

2. The apparatus according to claim 1, wherein said additional information signal from said addition information signal producing means comprises a duplication control signal used for duplication control of said signal.

3. The apparatus according to claim 1, wherein said signal comprises a digital video signal.

4. The apparatus according to claim 1, wherein said code is a spectrum spread code having different successive phases depending on said additional information signal.

5. The apparatus according to claim 1, wherein said code is a spectrum spread code having different successive series depending on said additional information signal.

6. A method for transmitting a signal, comprising the steps of:
   generating a code;
   producing a high level narrow band additional information signal;
   processing said high level narrow band additional information signal using said code to produce a low level wide band additional information signal;
   superimposing said high level narrow band additional information signal on said signal;

superimposing said low level wide band additional information signal on said signal having said high level narrow band additional information signal superimposed thereon; and transmitting an output from said step of superimposing said low level wide ban additional information signal.

7. The method according to claim 6, wherein said additional information signal comprises a duplication control signal used for duplication control of said signal.

8. The method according to claim 6, wherein said signal is a digital signal.

9. The method according to claim 6, wherein said code is a spectrum spread code having different successive phases depending on said additional information signal.

10. The method according to claim 6, wherein said code is a spectrum spread code having different successive series depending on said additional information signal.

* * * * *